(12) United States Patent
Haidler et al.

(10) Patent No.: US 7,188,429 B2
(45) Date of Patent: Mar. 13, 2007

(54) DIMENSIONAL GAGE WITH HOLLOW SPINDLE

(76) Inventors: John W. Haidler, 10953 Homeshore Dr., Pinckney, MI (US) 48169; Robert A. Cooper, 1332 Auston La., Chelsea, MI (US) 48118

( * ) Notice: Subject to any disclaimer, the term of this patent is extended or adjusted under 35 U.S.C. 154(b) by 143 days.

(21) Appl. No.: 11/044,572

(22) Filed: Jan. 27, 2005

(65) Prior Publication Data
US 2005/0160613 A1    Jul. 28, 2005

Related U.S. Application Data

(60) Provisional application No. 60/540,196, filed on Jan. 28, 2004.

(51) Int. Cl.
*G01B 3/00* (2006.01)
(52) U.S. Cl. .............. 33/542; 33/549; 33/554; 33/555
(58) Field of Classification Search ......... 33/542–543, 33/549–555, 555.1
See application file for complete search history.

(56) References Cited

U.S. PATENT DOCUMENTS

| | | | |
|---|---|---|---|
| 3,922,792 A * | 12/1975 | Ito ........................... 33/542 |
| 4,389,787 A * | 6/1983 | Solaroli ...................... 33/557 |
| 4,489,497 A * | 12/1984 | Schemel et al. .............. 33/836 |
| 4,562,648 A * | 1/1986 | Danielli ...................... 33/549 |
| 4,868,762 A | 9/1989 | Grim et al. |
| 4,880,991 A | 11/1989 | Boehnlein et al. |
| 4,918,627 A | 4/1990 | Garcia et al. |
| 5,505,003 A * | 4/1996 | Evans et al. ............... 33/501.7 |
| 6,272,762 B1 * | 8/2001 | Kinast et al. ................ 33/550 |
| 6,327,788 B1 * | 12/2001 | Seddon et al. ............... 33/551 |
| 6,381,861 B1 | 5/2002 | Deterling |
| 6,645,047 B1 | 11/2003 | Liskow |
| 6,772,529 B1 | 8/2004 | McGrath |
| 2002/0069547 A1* | 6/2002 | Hyatt et al. ................. 33/542 |

\* cited by examiner

*Primary Examiner*—Yaritza Guadalupe-McCall
(74) *Attorney, Agent, or Firm*—Miller, Canfield, Paddock and Stone; Robert K. Roth (57) ABSTRACT

A dimensional gage adapted to make measurements on a workpiece has a fixed member, a spindle assembly comprising a hollow spindle which receives the fixed member and is rotatable with respect to the fixed member, a motor which rotates the spindle assembly, and a sensing assembly attached to the fixed member and adapted to measure one or more dimensions of the workpiece. The dimensions may be measured both statically and dynamically, and the sensing assembly can have separate sensor assemblies for each dimension to be measured.

16 Claims, 7 Drawing Sheets

FIG. 7
[STATIC MEASUREMENT]

FIG. 8
[DYNAMIC MEASUREMENT]

DIMENSIONAL GAGE WITH HOLLOW SPINDLE

RELATED APPLICATION

This application claims priority benefit of U.S. provisional patent application No. 60/540,196 filed on Jan. 28, 2004.

FIELD OF THE INVENTION

This invention relates to improvements in dimensional gages, and more particularly to improvements dimensional gages used to measure and confirm the dimensions of brake rotors, drums, flywheels and the like.

BACKGROUND OF THE INVENTION

Dimensional gages are used to confirm the shape of a part or workpiece. Examples of workpieces often measured with dimensional gages include brake rotors, drums, flywheels and similar precision turned parts. Dimensional gaging helps to ensure that feature size and shape meet drawing requirements and are suitable for use as a component of a larger assembly. Typical dimensional gaging criteria usually specify that external features be measured with respect to specific datums, such as, for example a mounting surface and a bore diameter. Lateral runout for a disc brake rotor or circular runout for a brake drum are normally specified this way and are critical to workpiece performance.

Typically the mounting surface has been measured dynamically, i.e., during rotation of the part. The bore diameter is measured statically—without movement of the part. With known dimensional gages, two separate stations have been required as it has not been simultaneously possible to locate and to measure both of these critical dimensions. Typically a single station would dynamically measure a mounting surface, but could not measure the bore diameter because the bore was occupied by a collet or other centering and clamping part. Therefore a second gaging station was required to measure bore diameter. A two station gaging operation takes up space and is relatively expensive. Moreover additional time is required for transfer of the part. It would be desirable to provide a single station dimensional gage which can make both static measurements and dynamic measurements of a workpiece.

SUMMARY OF THE INVENTION

In accordance with a first aspect, dimensional gage adapted to make measurements on a workpiece has a fixed member, a spindle assembly comprising a hollow spindle which receives the fixed member and is rotatable with respect to the fixed member, a motor which rotates the spindle assembly, and a sensing assembly attached to the fixed member and adapted to measure one or more dimensions of the workpiece. The dimensions may be measured both statically and dynamically at a single station, and the sensing assembly can have separate sensor assemblies for each dimension to be measured.

From the foregoing disclosure and the following more detailed description of various preferred embodiments it will be apparent to those skilled in the art that the present invention provides a significant advance in the technology of dimensional gaging. Particularly significant in this regard is the potential the invention affords for providing a high quality, low cost dimensional gage. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of the dimensional gage as disclosed here will be determined in part by the particular intended application and use environment. Certain features of the illustrated embodiments have been enlarged or distorted relative to others to enhance visualization and clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the dimensional gage disclosed here. The following detailed discussion of various alternative and preferred features and embodiments will illustrate the general principles of the invention with reference to a dimensional gage particularly suitable for use in measuring brake rotors, drums, flywheels and the like. Other embodiments suitable for other applications will be apparent to those skilled in the art given the benefit of this disclosure.

Figure 1:
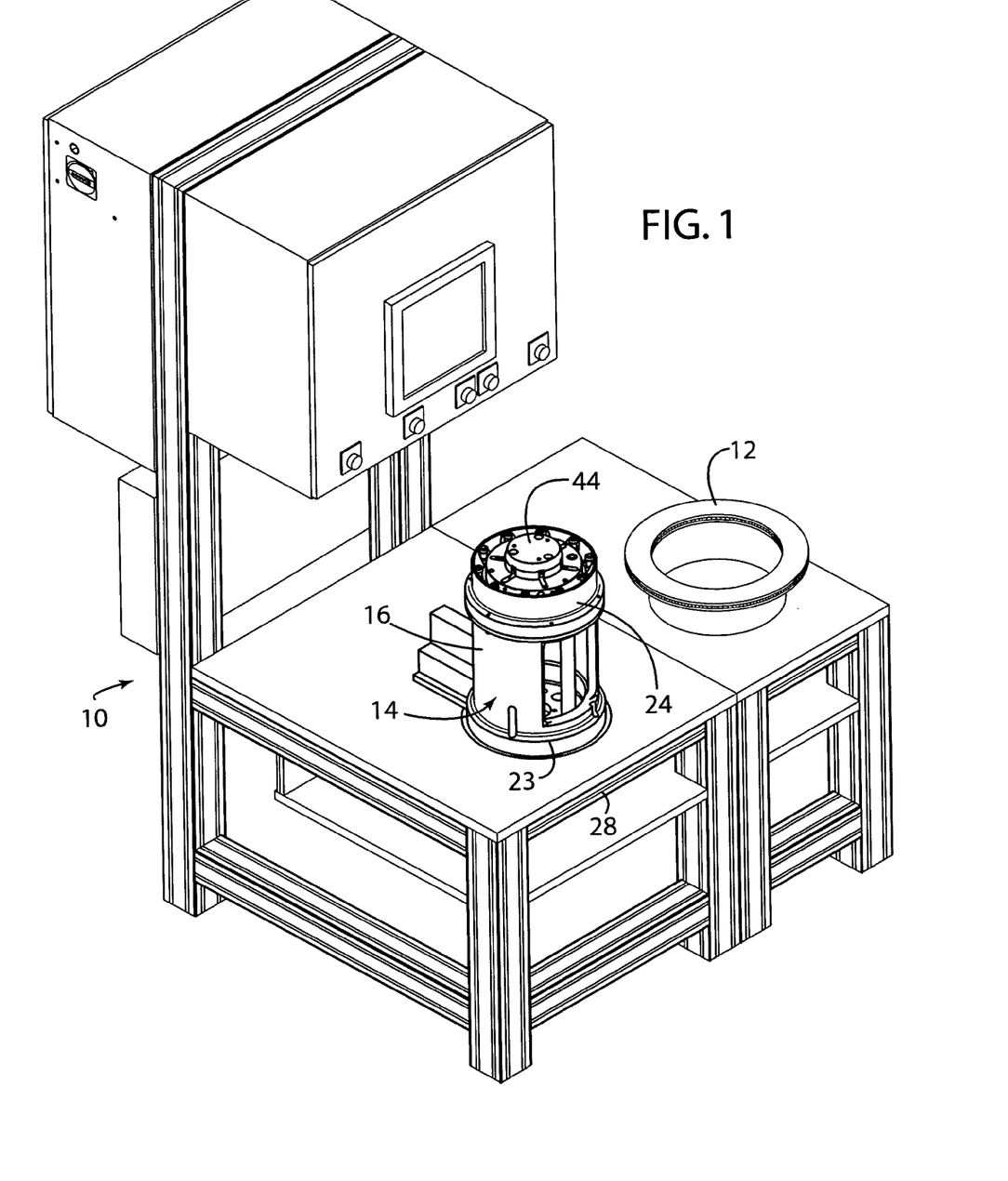
FIG. 1 is a perspective view of a dimensional gage in accordance with a preferred embodiment.

Referring now to the drawings, FIG. 1 shows a dimensional gage 10 in accordance with a preferred embodiment. The gage 10 is shown as having a generally cylindrical shaped spindle assembly 14, comprising a support 23 mounted on a base fixture 28, a spindle 16 mounted on the support, and a square up ring 24 on top of the spindle. In accordance with a highly advantageous feature, the spindle 16 is hollow in its interior 20, and provided with at least one window 22 for access into the interior 20. A sample workpiece 12 is shown off to one side as a brake rotor. The rotor would be mounted on the top of the spindle and around a top plate 44. The top plate geometry may be varied, depending on the workpiece and the dimensions of the workpiece to be measured.

Figure 2:
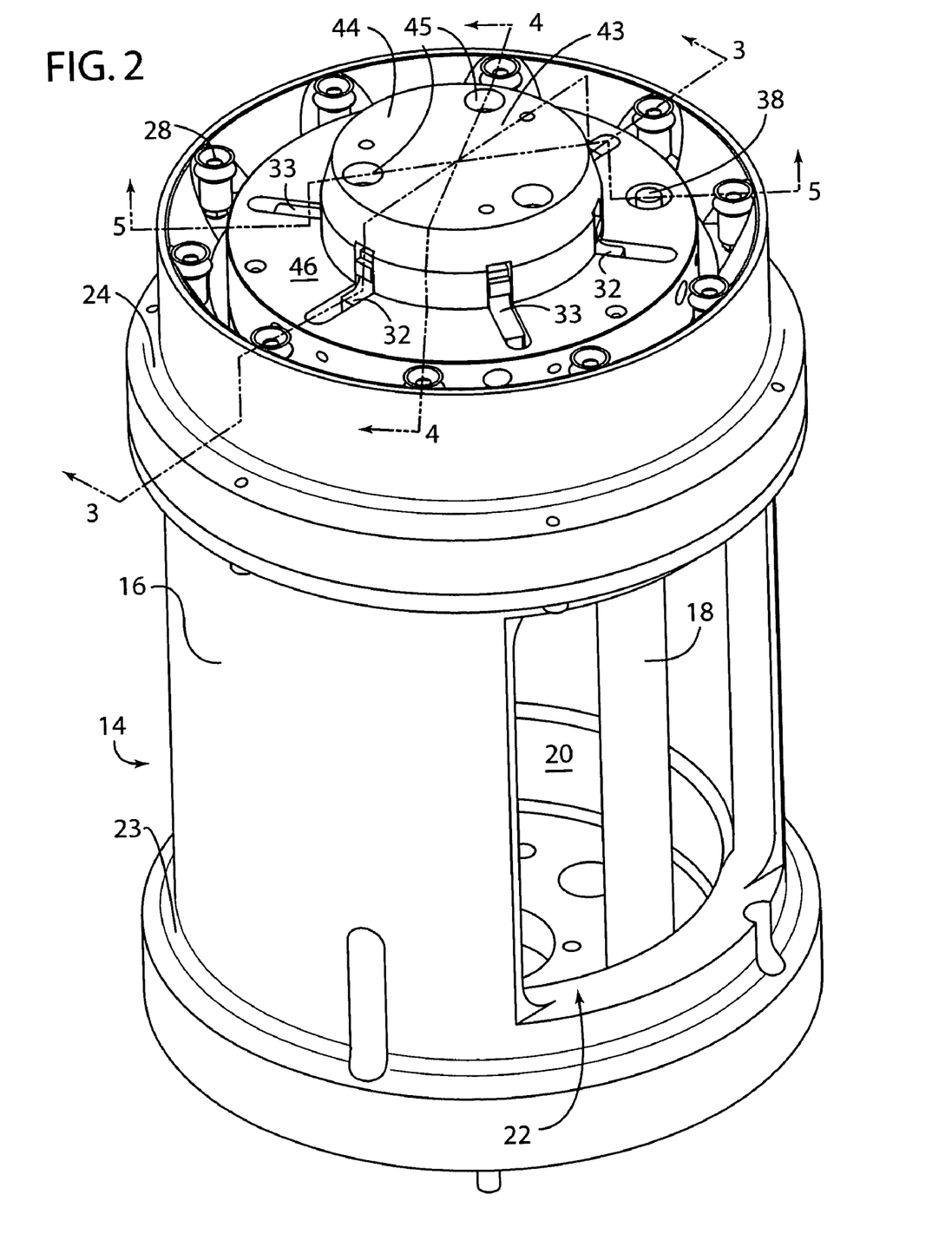
FIG. 2 is an isolated perspective view of a hollow spindle for the dimensional gage of FIG. 1.

FIG. 2 shows a perspective view of the spindle assembly 14 with an interiorly mounted fixed member 18. The fixed member 18 serves as a mount for gage tooling, including a sensing assembly for measuring various dimensions of the workpiece. One or more windows 22 allow access to the sensing assembly.

A vacuum chuck may be used to help hold the workpiece 12 in place. In the preferred embodiment shown in FIG. 4, a plurality of suction cups 26 may be positioned around a circumference of the spindle assembly square up ring. The suction cups 26 can serve two functions. First, a partial vacuum may be applied to a workpiece at the suction cups to help seat and hold the workpiece. This is especially useful for dynamic measurement. Second, the air flow in the suction cups 26 can be reversed, applying mild pressure under the workpiece after measurement to help with removal from the dimensional gage.

In addition to the fixed structural leg 18, the fixed member also comprises a top surface 46. This top surface 46 cooperates with the top of the square up ring 24 to receive the workpiece. In the case of a rotor or drum, this means the part 12 rests on a precision flat surface to establish the location of the mounting surface 95 (shown in FIG. 7). The top plate 44 is attached to the top surface 46 at holes 45 which can receive fasteners. Adjustment screw holes 43 may be provided for fine adjustment of the top plate 44.

In accordance with another highly advantageous feature, the spindle assembly 14 can rotate with respect to the fixed member. Advantageously, this allows a sensing assembly to be mounted on the fixed member 18, so that both measurements can be made on the workpiece both statically and dynamically. For a rotor or drum, this arrangement offers the advantages of a precision measurement of a ring to locate the part, yet leave the bore diameter accessible for measurement from within.

The sensing assembly can comprise a first sensor assembly for measuring dimensions statically or while the workpiece is held with respect to the fixed member, and a second sensor assembly for measuring dimensions dynamically or while the spindle assembly rotates with respect to the fixed member 18, carrying the workpiece with it. In the example shown in the Figs., the static measurement is a bore diameter 96 (shown in FIG. 7), and the dynamic measurement is a mounting surface circumference 95.

Figure 7:
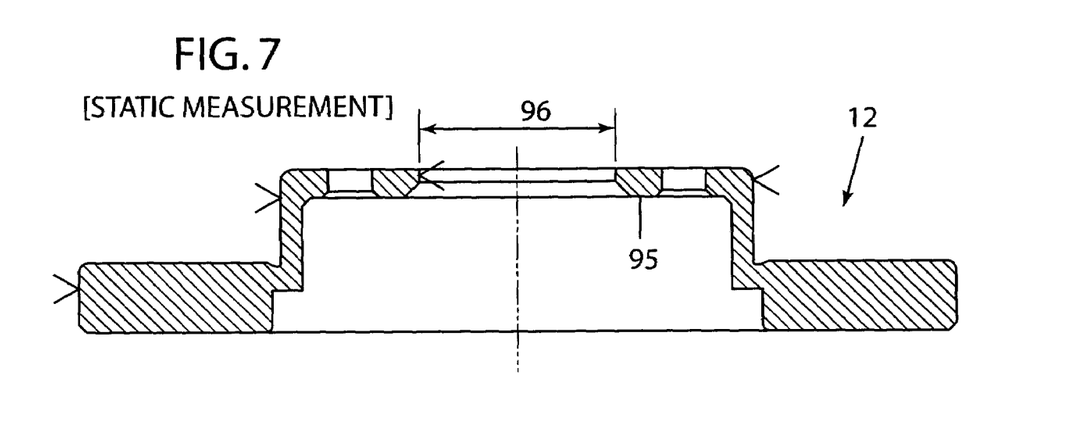
FIGS. 7–8 provide examples of typical gage locations and measurements (both static and dynamic) on a representative workpiece.

The sensors 34, 38 are preferably transducers, such as, for example, LVDTs. However other precision measurement devices for use as a sensor such as non-contact sensors, will be readily apparent to those skilled in the art given the benefit of this disclosure. Three transducers 34 are used to measure the bore diameter 96 by sensing the position of independent rocker arms (or sensing jaws) 33 that are pushed into contact with the part. FIG. 2 shows the rocker arms 33 positioned circumferentially around the top plate 44. The gage tooling also may comprise three centering arms 32 spaced between the rocker arms 33. The centering arms 32 serve to roughly center the workpiece for the dynamic measurements. The centering arms may be pivotally mounted on pivot pins 35. Each centering arm 32 may have a return spring 98 to help return the centering arm to a resting position. The rocker arms 33 may also be pivotally mounted on pivot pins 36, shown in FIG. 3, allowing for sensitivity to slight position adjustment, and may have a spring 99 to force the sensing arm into contact with the part (at bore diameter 96). Other combinations of centering arms, rocker arms and sensors for measurement of part dimensions will be readily apparent to those skilled in the art, given the benefit of this disclosure. The measurement of the bore diameter 96 (seen in FIG. 7) may be preferably performed while the workpiece is stationary, i.e., held fast to the fixed member. In addition to the bore diameter, FIG. 7 shows an example of a series of locations (as indicated with respect to the workpiece 12 by the carat sign >) where additional static measurements may be made.

Figure 8:
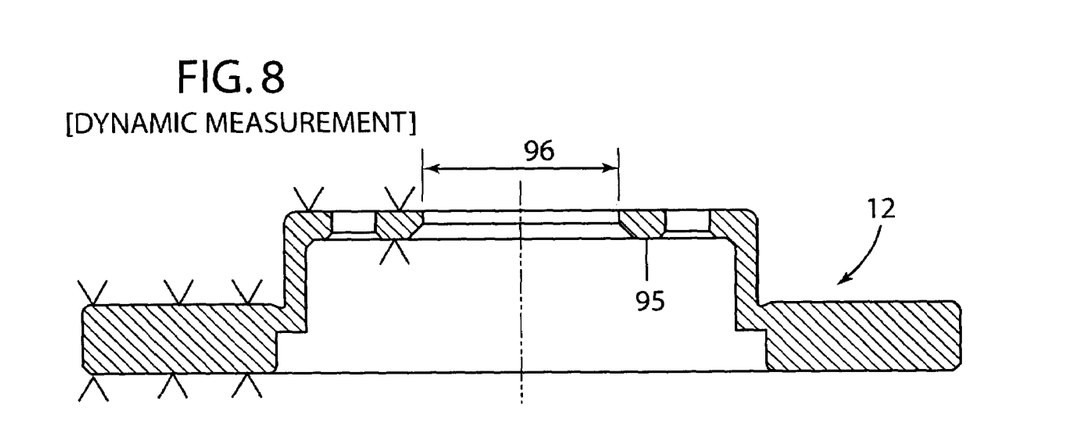

An additional sensor 38 (shown in FIGS. 2 and 4) is positioned so as to be in direct contact with the mounting surface 95 (Seen in FIG. 8) when a workpiece is placed on the dimensional gage. This sensor determines flatness of the mounting surface 95 at that radius and detects conical taper. As shown in FIG. 8, additional transducers may be placed at other radii (located as indicated with respect to the workpiece 12 by the carat sign >) to detect a concave or convex cupped shape. Measurements may be recorded through a full revolution of the part.

In the preferred embodiment shown in the Figs., a single gage point is measured with sensor 38 just outside the edge of the bore which evaluates flatness and taper of the mounting surface 95. This is an adequate evaluation for many applications. Additional points may be measured dynamically as shown by the example in FIG. 8. For the representative workpiece shown in the drawings, a brake rotor, lateral runout of the brake rotor surfaces are the most critical criteria. Dynamic measurement of a ring on the working surface provides a very practical simulation of the actual assembly and a reliable measure of lateral runout.

Figure 3:
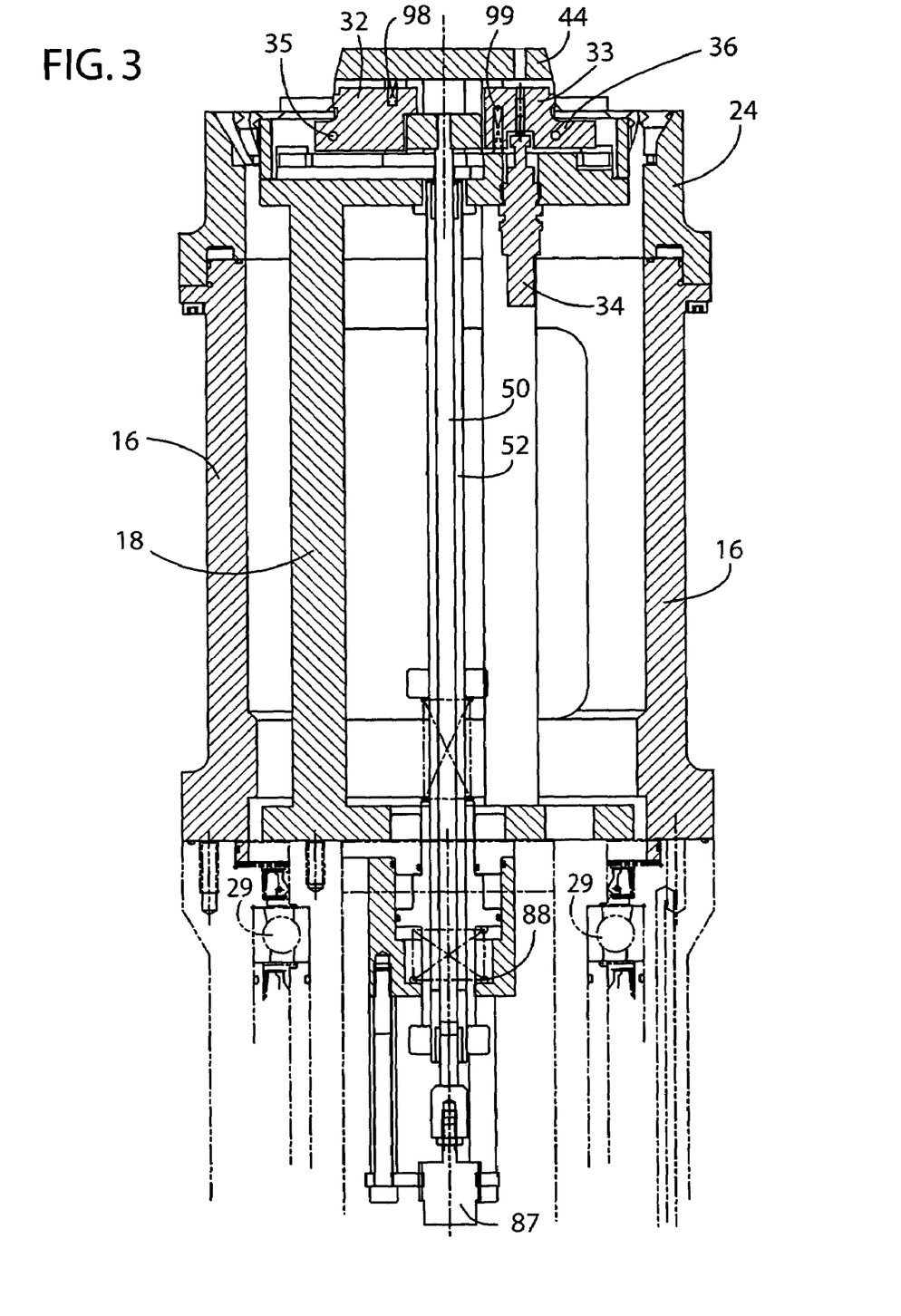
FIG. 3 is a cross section view taken along line 3—3 in FIG. 2, showing a fixed structural leg and a rotatable support and sensors for static and dynamic measurement.
Figure 4:
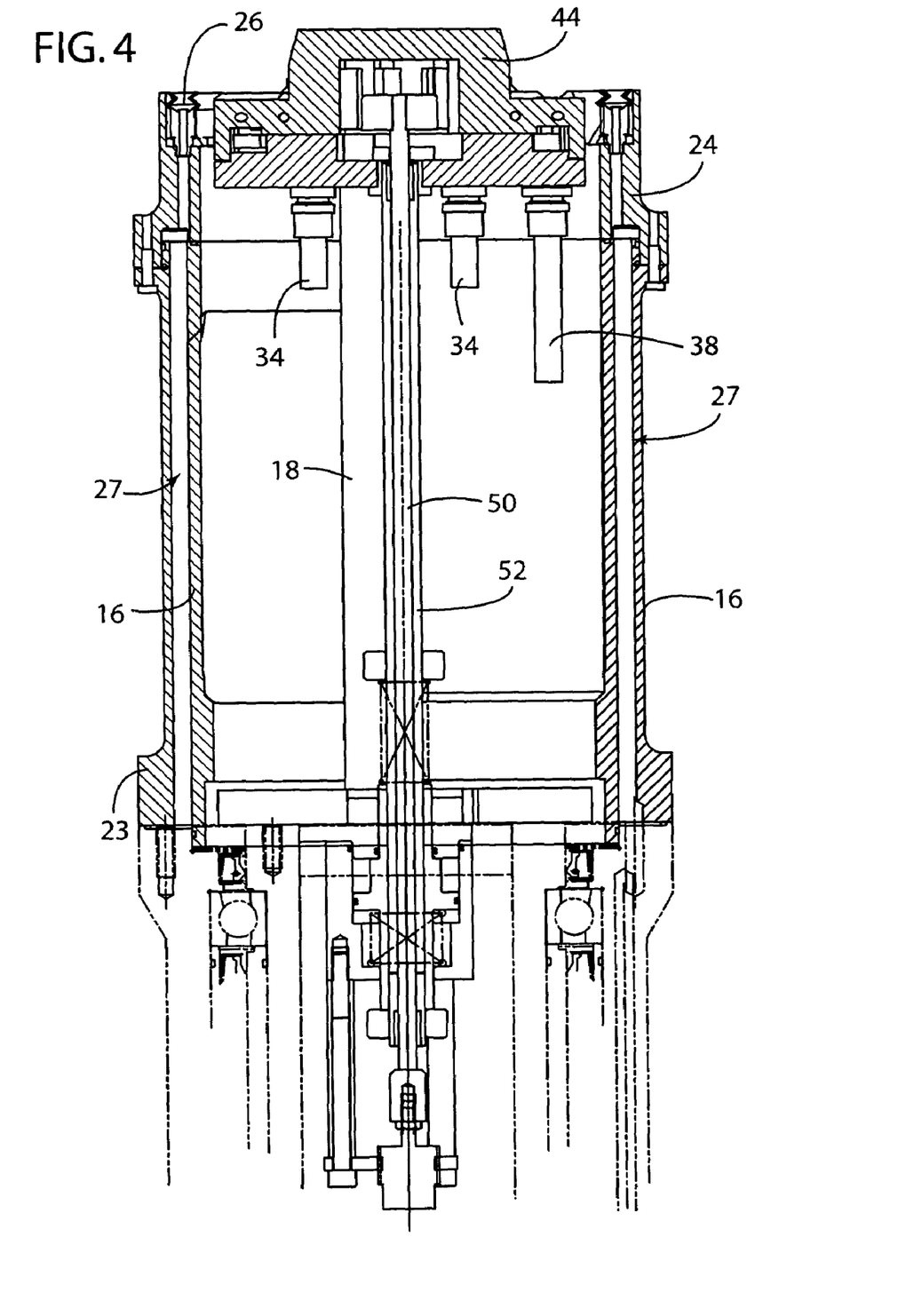
FIG. 4 is a cross section view taken along line 4—4 in FIG. 2, showing a square up surface adapted to receive a workpiece.
Figure 5:
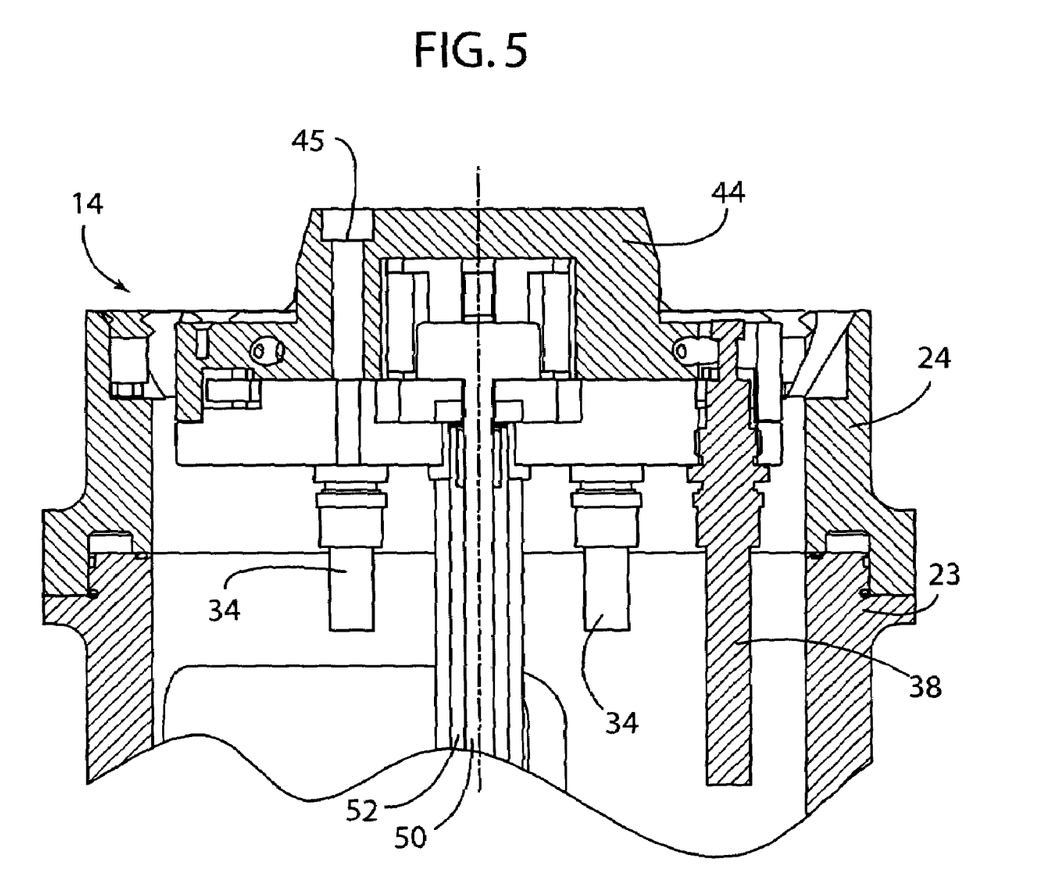
FIG. 5 is a cross section view taken along line 5—5 in FIG. 2, showing a sensor used to measure a circumferential portion of a surface of a workpiece.

FIGS. 3–5 show cross sections through the dimensional gage shown in FIG. 2, showing an inner rod 50 and outer rod 52. The inner rod 50 cooperates with the centering arms 32 to help clamp and center the part. That is, once the workpiece 12 is placed on top of the dimensional gage, the inner rod is moved up by pneumatic cylinder 87, forcing the centering arms into snug engagement with the workpiece. The outer rod 52, when urged up by pneumatic cylinder 88, retracts the sensing rocker arms 33. When moved down, the sensor arms 33 are released so that the sensors may measure the part dimensions. FIG. 3 shows both the outer rod 52 and inner rod 50 down.

Figure 6:
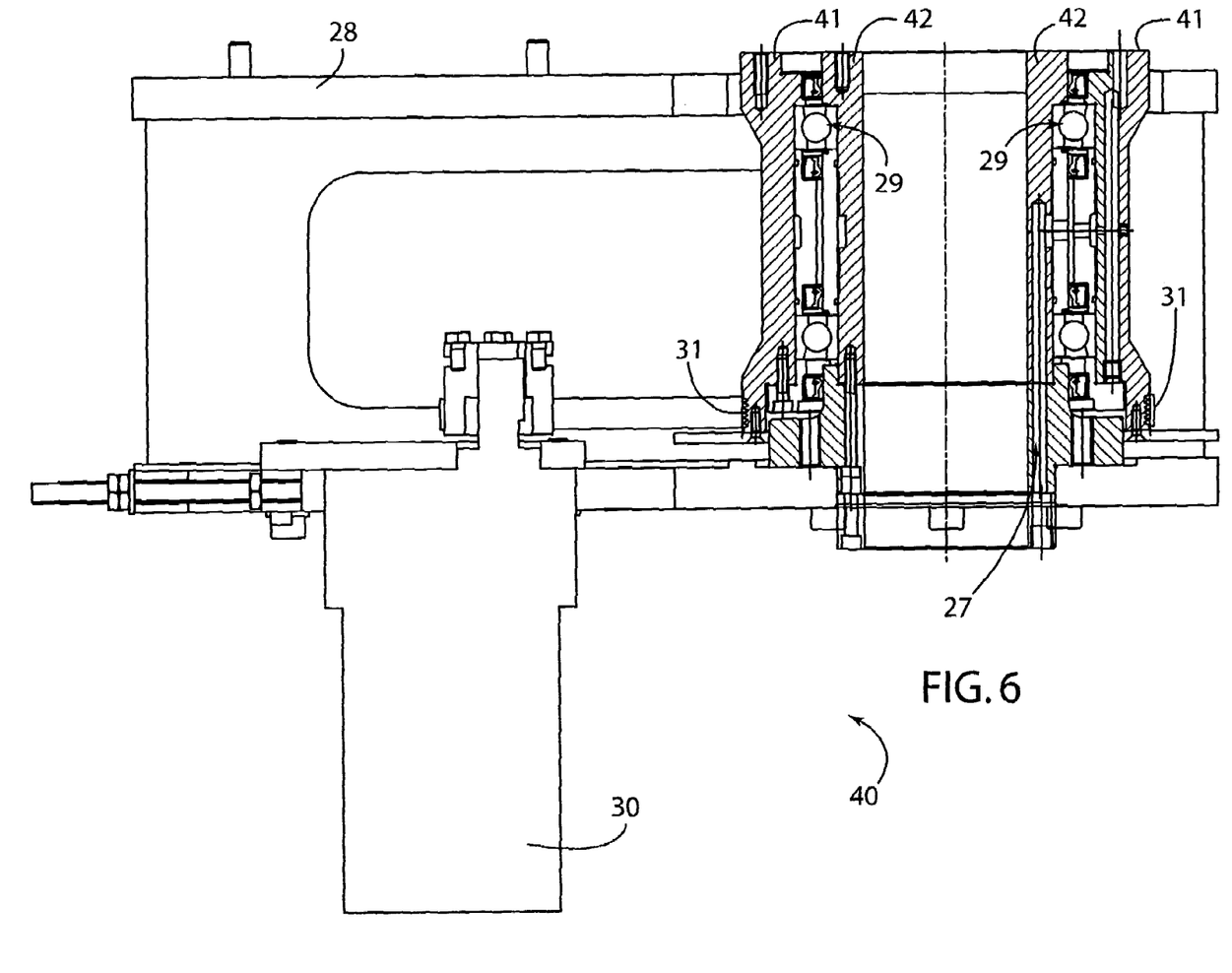
FIG. 6 is a cross section view of a base assembly to which the hollow spindle is mounted, where a drive motor is shown mounted remote from the spindle.

FIGS. 4 and 6 show an air feed channel 27 which extends through a drive assembly 40 and the spindle 16 to the suction cups 26. The air feed channel can be connected to a pump to draw a partial vacuum to help hold the workpiece to the fixed member 18 or to apply pressurized air to help release the workpiece from the fixed member 18.

FIG. 6 shows a preferred embodiment where a drive assembly comprises a motor 30 mounted on the base 28 positioned remote from the spindle 16 and connected by a drive mechanism, here, a drive belt 31. A bearing assembly 29 has a rotatable outer sleeve 41 attached to the spindle assembly 14 and a fixed inner sleeve attached to the base fixture 28. This construction is advantageous for certain preferred embodiments where it is desirable to increase access to the hollow interior 20 of the spindle.

In operation, a workpiece 12 is placed on the rest ring 24. The centering arms 32 are moved into engagement with the workpiece, centering the workpiece around the top plate 44. Optionally a partial vacuum may be applied to the workpiece at the suction cups 26 to help hold the workpiece. Next, the sensing arms 33 are extended into engagement with the workpiece. The bore diameter 96 is measured (static measurement), and then the centering arms 32 and the rocker arms 33 are retracted. Dynamic measurement of the working surface 95 follows, with the part 12 rotated at least 1 revolution, allowing extended sensor 38 to measure the location of a circumference. As an example, 500 data point measurements may be made by the sensor during one revolution of the spindle assembly 16. The sensor 38 is retracted and the vacuum is released. Optionally pressure may be applied through the air feed channel 27 to remove the workpiece and permit the cycle of measurement to be continued.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A dimensional gage adapted to make measurements on a workpiece comprising, in combination:
   a fixed member;
   a spindle assembly, rotatable with respect to the fixed member, wherein the fixed member is positioned inside the spindle;
   a motor which rotates the spindle assembly;
   a sensing assembly attached to the fixed member and adapted to make measurements of the workpiece both while the spindle assembly is held fixed with respect to the fixed member and while the spindle assembly rotates with respect to the fixed member.

2. The dimensional gage of claim 1 wherein the sensing assembly comprises
   a first sensor assembly adapted to measure a first dimension of the workpiece; and
   a second sensor assembly adapted to measure a second dimension of the workpiece, wherein the first sensor assembly and the second sensor assembly are mounted on the fixed member;
   wherein the first sensor assembly measures the first dimension while the spindle assembly is held fixed with respect to the fixed member, and the second sensor assembly measures the second dimension while the spindle assembly is moving with respect to the fixed member.

3. The dimensional gage of claim 1 wherein the sensing assembly comprises LVDTs.

4. The dimensional gage of claim 1 wherein the spindle assembly comprises a generally cylindrical shaped spindle.

5. The dimensional gage of claim 1 wherein the spindle assembly comprises a hollow spindle.

6. The dimensional gage of claim 5 wherein the spindle has at least one window permitting access to the fixed member and to the sensing assembly.

7. The dimensional gage of claim 1 wherein the motor is remote from the spindle assembly.

8. A dimensional gage adapted to make measurements on a workpiece comprising, in combination:
   a fixed member;
   a spindle assembly, rotatable with respect to the fixed member;
   a motor which rotates the spindle assembly;
   a first sensor assembly adapted to measure a first dimension of the workpiece;
   a second sensor assembly adapted to measure a second dimension of the workpiece, wherein the first sensor assembly and the second sensor assembly are mounted on the fixed member; and
   wherein the first sensor assembly measures the first dimension while the spindle assembly is held immobile with respect to the fixed member, and the second sensor assembly measures the second dimension while the spindle assembly is moving with respect to the fixed member, and the second dimension is generally perpendicular to the first dimension.

9. The dimensional gage of claim 8 wherein the first sensor assembly comprises at least one sensing arm and a corresponding sensor, wherein the at least one sensing arm is adapted to directly engage the workpiece.

10. The dimensional gage of claim 9 wherein the first sensor further comprises three sensing arms positioned circumferentially around the fixed member.

11. The dimensional gage of claim 8 further comprising at least one centering arm positioned on the fixed member.

12. The dimensional gage of claim 8 wherein the fixed member has an adjustable top plate adapted to engage the workpiece.

13. A dimensional gage adapted to make measurements on a workpiece comprising, in combination:
    a fixed member,
    a spindle assembly, comprising a hollow spindle rotatable with respect to the fixed member, and the fixed member is positioned inside the spindle;
    a motor which rotates the spindle assembly; and
    a sensing assembly attached to the fixed member and adapted to measure one or more dimensions of the workpiece.

14. The dimensional gage of claim 13 wherein the spindle assembly further comprises an air feed channel adapted to draw a partial vacuum to help hold the workpiece to the spindle assembly and to apply pressurized air to help release the workpiece from the spindle assembly.

15. The dimensional gage of claim 14 further comprising at least one vacuum chuck operatively connected to the air feed channel.

16. The dimensional gage of claim 13 further comprising:
    centering arms adapted to align the workpiece and sensor arms adapted to measure the workpiece; and
    an inner rod and an outer rod;
    wherein movement of the inner rod urges the centering arm into engagement with the workpiece, and movement of the outer rod retracts the sensing arms to permit measurement of the workpiece.

* * * * *